(12) United States Patent
Zha et al.

(10) Patent No.: US 9,022,721 B2
(45) Date of Patent: May 5, 2015

(54) VERTICAL AXIS WIND TURBINE

(71) Applicant: Wind Power Systems, LLC, Boca Raton, FL (US)

(72) Inventors: Gecheng Zha, Cutler Bay, FL (US); Bertrand Dano, Miami, FL (US)

(73) Assignee: Wind Power Systems, LLC, Boca Raton, FL (US)

( * ) Notice: Subject to any disclaimer, the term of this patent is extended or adjusted under 35 U.S.C. 154(b) by 461 days.

(21) Appl. No.: 13/648,896

(22) Filed: Oct. 10, 2012

(65) Prior Publication Data
US 2013/0115069 A1 May 9, 2013

Related U.S. Application Data

(60) Provisional application No. 61/545,424, filed on Oct. 10, 2011.

(51) Int. Cl.
*F03D 1/04* (2006.01)
*F03D 3/04* (2006.01)

(52) U.S. Cl.
CPC .............. *F03D 1/04* (2013.01); *F03D 3/0409* (2013.01); *Y02B 10/30* (2013.01); *Y02E 10/74* (2013.01)

(58) Field of Classification Search
CPC ....... F03D 1/04; F03D 1/0641; F03D 3/0409; F03D 3/065; F05B 2240/213
See application file for complete search history.

(56) References Cited

U.S. PATENT DOCUMENTS

| | | | | |
|---|---|---|---|---|
| 1,766,765 | A * | 6/1930 | Savonius | 416/132 R |
| 4,047,834 | A * | 9/1977 | Magoveny et al. | 415/53.1 |
| 5,664,418 | A * | 9/1997 | Walters | 60/398 |
| 5,852,331 | A * | 12/1998 | Giorgini | 290/55 |
| 6,465,899 | B2 * | 10/2002 | Roberts | 290/44 |
| 6,666,650 | B1 * | 12/2003 | Themel | 416/200 R |
| 6,740,989 | B2 * | 5/2004 | Rowe | 290/55 |
| 7,220,107 | B2 * | 5/2007 | Kaneda | 416/186 A |
| 2008/0309086 | A1 | 12/2008 | Takaichi et al. | |

(Continued)

OTHER PUBLICATIONS

Anonymous, "Science behind the systems: Zero cogging", Directional Energy Corp, Internet article: http://www.directionalenergy.com/brochures/, (retrieved Mar. 12, 2013).
Anonymous, "Science behind the systems: ZeroCogging generator", Directional Energy Corp, Internet article: http://www.directionalenergy.com/brochures/, (retrieved Mar. 12, 2013).

(Continued)

*Primary Examiner* — Igor Kershteyn
(74) *Attorney, Agent, or Firm* — McHale & Slavin, P.A.

(57) ABSTRACT

A vertical axis wind turbine formed from a concentric arrangement of fixed stator blades to provide fluid flow acceleration into an arrangement of rotatable blades secured to a generator for invoking electrical power generation. The stator blades are maintained in a fixed position by use of an upper and lower stator plate. The rotor blades include an upper and lower plate, the upper plate coupled to the upper stator plate, and the lower rotor plate coupled to the generator. The amount of stator and rotor blades may be scaled in number and size depending upon the type of generator to be driven and associated mechanical energy to be obtained. The stator blades are designed for air deflection in a direction for optimal rotor blade rotation by accelerating air flow into a pre-swirl before the flow contacts the rotor blades. Each stator blade is oriented at a sufficient stagger angle so that an angle of the relative velocity does not exceed the stall angle of said rotor blade.

20 Claims, 6 Drawing Sheets

(56) References Cited

U.S. PATENT DOCUMENTS

2009/0261597 A1  10/2009  Platt
2009/0304512 A1  12/2009  Attey
2011/0085909 A1   4/2011  Chapman
2012/0068463 A1   3/2012  Langenfeld et al.
2012/0070293 A1   3/2012  Cwiernia et al.
2012/0235418 A1   9/2012  Plaskove et al.

OTHER PUBLICATIONS

Anonymous, "Science behind the systems: The blade shape that revolutionized wind turbines", Directional Energy Corp, Internet article: http://www.directionalenergy.com/brochures/, (retrieved Mar. 12, 2013).

* cited by examiner

VERTICAL AXIS WIND TURBINE

PRIORITY CLAIM

In accordance with 37 C.F.R. 1.76, a claim of priority is included in an Application Data Sheet filed concurrently herewith. Accordingly, the present invention claims priority under 35 U.S.C. §119(e), 120, 121, and/or 365(c) to U.S. Provisional Patent Application No. 61/545,424, entitled "Vertical Axis Wind Turbine", filed on Oct. 10, 2011. The contents of which the above referenced application is incorporated herein by reference in its entirety.

FIELD OF THE INVENTION

The present invention relates to the field of wind turbines and more particularly to a vertical axis wind turbine having a concentric arrangement of fixed blades for deflecting wind forces for wind flow acceleration.

BACKGROUND OF THE INVENTION

Conventional wind turbines operate on the energy of the wind to turn two or three propeller-like blades around a rotor. The rotor is connected to either a vertical or horizontal shaft mounted generator that spins to generate electricity. Wind turbines are preferably mounted on a tower or building structure so as to capture the most energy in a location so as to receive the full effects of the wind yet not disturb the immediate environment. Typically wind turbines are positioned about thirty meters (30 m) above the ground where they can take advantage of winds that are not affected by ground effect obstructions. Wind turbines consist generally of blades that spin with respect to two orientations, vertically orientated axis or horizontally orientated axis.

Wind energy is fueled from the kinetic energy of the wind, making wind a clean fuel source. Wind energy will not pollute the air like power plants that rely on combustion of fossil fuels, such as coal or natural gas. Wind turbines that rotate about a horizontal axis are best suited for large unobstructed areas hence the creation of the wind farms. Vertically disposed wind turbines are well suited for congested areas, such as residential neighborhoods.

Wind power must compete with conventional generation sources on a cost basis. Depending on how energetic a wind site is, the wind farm may or may not be cost competitive. Even though the cost of wind power has decreased dramatically in the past ten (10) years, the technology still requires a higher initial investment than fossil-fueled generators as they typically operate at ten percent (10%) efficiency.

Further, although wind power plants have relatively little impact on the environment compared to other conventional power plants, there is some concern over the noise produced by the rotor blades, aesthetic (visual) impacts, and sometimes birds that have been killed by flying into the rotors of horizontal placed axis.

The need for renewable energy sources is constantly increasing. A focus on improved wind turbines has steadily increased over time. The general quandary with wind turbines to date relates to the inefficient transfer of kinetic energy to mechanical energy for power generation. A conventional wind turbine converts as little as ten percent (10%) of the possible kinetic energy into mechanical energy for electricity generation due to the many factors that affect the efficiency of a conventional wind turbine.

What is lacking in the art is a vertical axis wind turbine design capable of producing a wind turbine capable of improving upon the efficiencies necessary to convert a higher amount of kinetic energy into mechanical energy. The instant invention addresses these and other shortcomings by introducing a vertically aligned wind turbine power generator having improved rotor and stator blade geometry.

SUMMARY OF THE INVENTION

Disclosed is an improved fluid turbine formed from a concentric arrangement of fixed stator blades having an optimal geometric formation to provide fluid flow acceleration into a concentric arrangement of rotatable blades having a geometric formation for rotating to invoke electrical power generation. In a basic configuration, the turbine of the instant invention has at least three stator blades and at least two rotor blades for the direction of air. The amount of stator and rotor blades may be scaled in number and size depending upon the type of generator to be driven and associated mechanical energy to be obtained. The turbine preferably has a vertical axis for deflecting air acceleration into a rotatable rotor blade assembly that is coupled to a generator to invoke electrical power generation. The stator blades are designed for air deflection in a direction for optimal rotor blade rotation by accelerating air flow into a pre-swirl before the flow contacts the rotor blades. The rotor blades output the power by turning flow with a large angle for rotation of a generator.

Accordingly, it is an objective of the instant invention to provide a wind turbine having stator and rotor blades of a geometric formation that provide for greater efficiencies over a conventional vertical axis wind turbine, the wind turbine having a vertical axis that allows for a smaller footprint, reduced noise, and an omni-directional (axis-symmetric) design to allow wind from any direction to be captured.

It is a further objective of the instant invention to encase the rotor assembly within the stator assembly so that only two bearings are needed and constitute the only mechanical rotating parts of the assembly.

It is a further objective of the instant invention to strategically position stator blades to accelerate the airflow by passage area reduction.

It is a further objective of the instant invention to strategically position stator blades to generate pre-swirl of the flow, which is to guide the flow to tangential direction in the direction of rotor rotation instead of keeping the flow in the radial direction before the flow hits the rotor.

Yet still a further objective of the instant invention is to disclose the use of stator blades that are oriented at a sufficient stagger angle so that an angle of the relative velocity does not exceed the stall angle of a rotor blade.

It is a still further objective of the invention to provide a plurality of stator blades for engaging an incoming wind flow. The wind flow may include, inter alia, wind, air water or the like fluid flow containing kinetic energy for conversion to mechanical energy for use in power generation.

It is a further objective of the instant invention to use the stator leading edges as a support for an optional mesh/screen to prevent injuries and protect the invention from unwanted objects in the proximity of the rotor assembly.

It is another objective of the instant invention to provide a plurality of rotor blades rotatably coupled that have an increased rotor turning angle capable of improved efficiency.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Referring now to the Figures in cooperation with the description, specific embodiments shall be presented exemplifying the invention and best mode known at the time of presentation.

Figure 1:
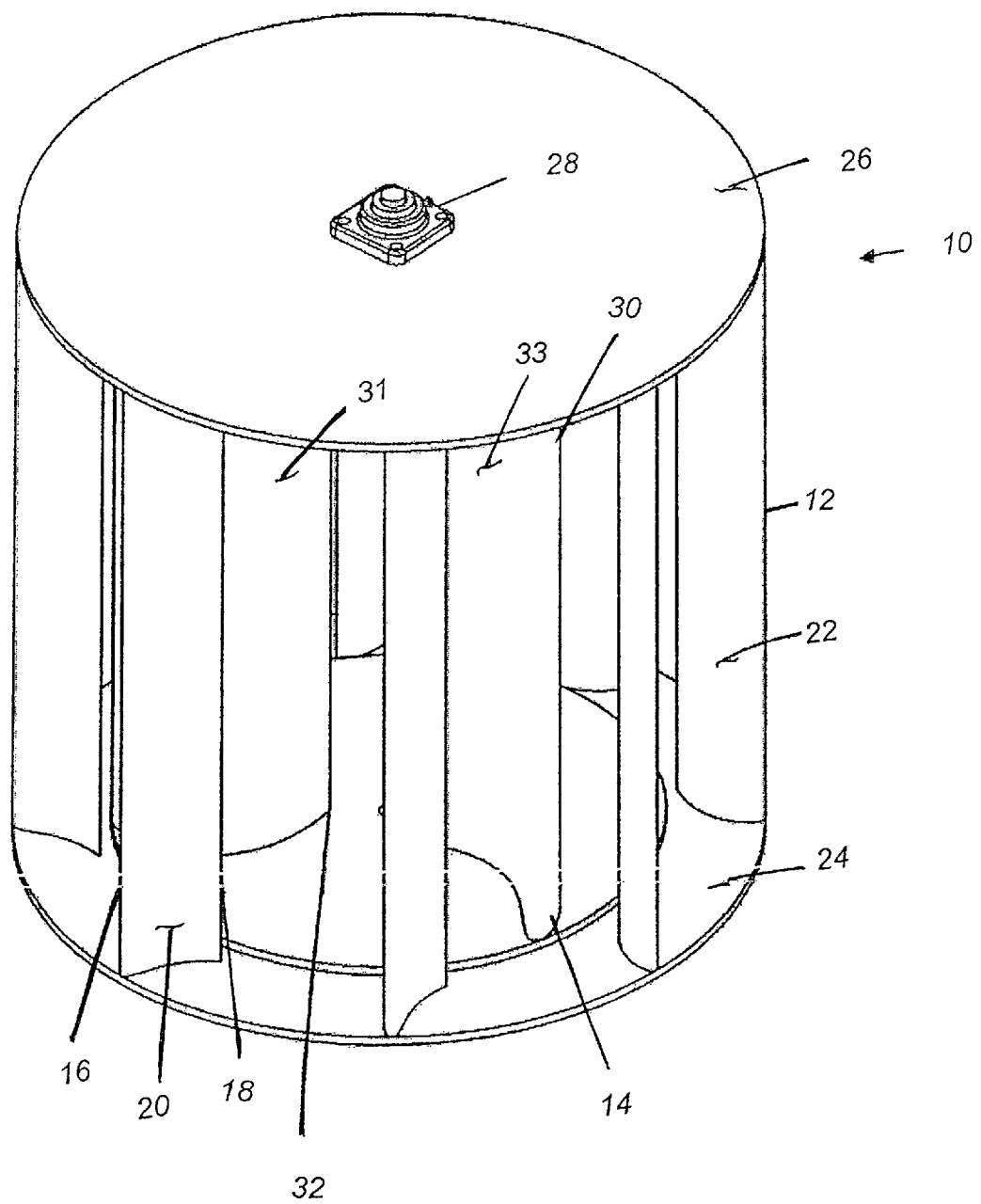
FIG. 1 depicts a perspective view of a vertical axis wind turbine according to an embodiment of the instant invention.
Figure 2:
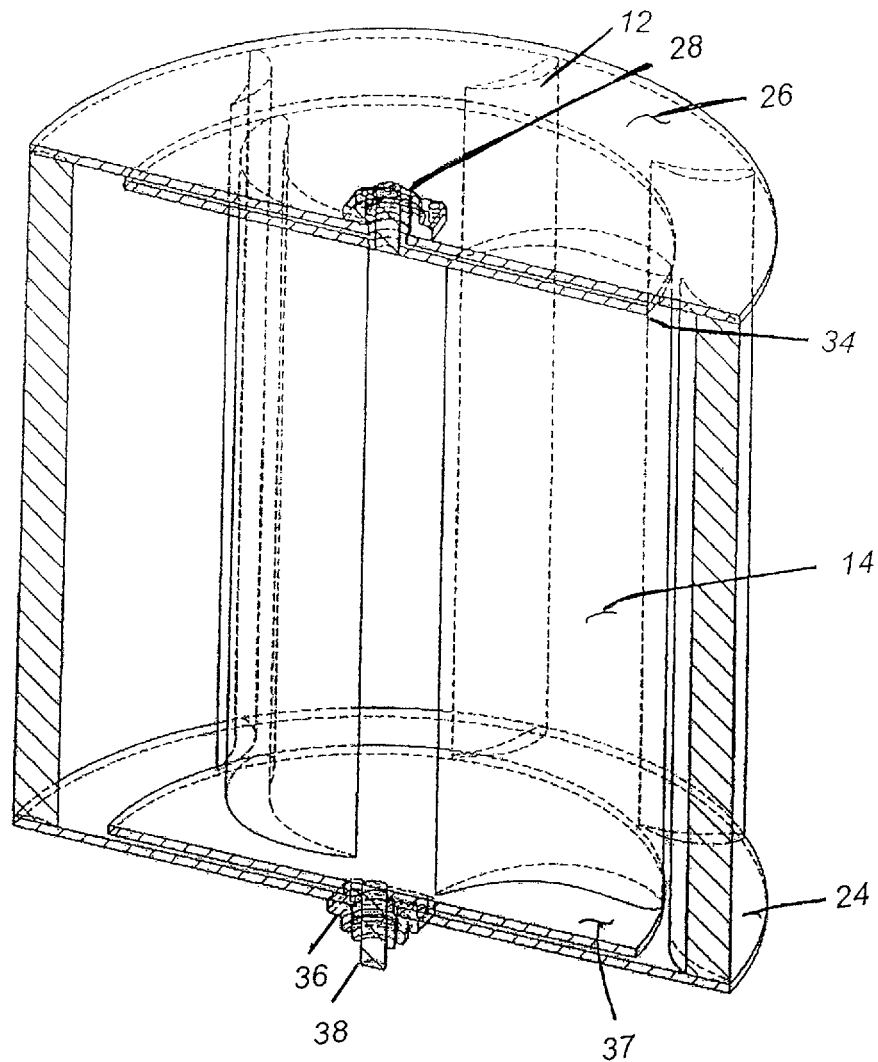
FIG. 2 depicts a cross sectional perspective view thereof.
Figure 3:
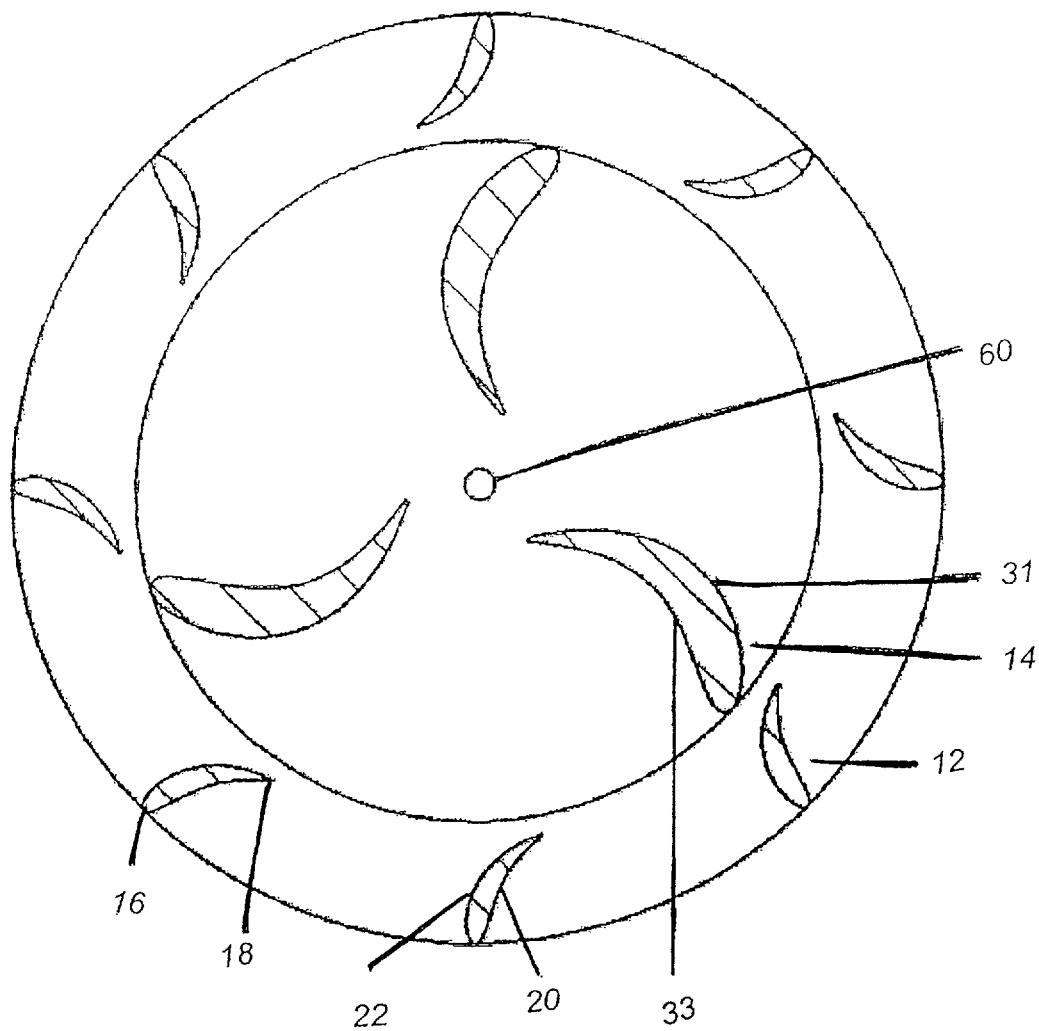
FIG. 3 depicts a cross sectional top view thereof.

FIGS. 1-3 illustrate a graphic orientation of a perspective of a vertical axis wind turbine 10. Stator blades 12 having a predefined geometry are positioned for guiding wind flows and velocities for use in spinning rotor blades 14. The rotor blades coupled to a centrally disposed vertical axis generator (not shown), the rotation of the rotor blades causing rotation of the generator to permit the generation of power. The wind turbine includes a number of fixed stator blades 12 and a number of rotor blades 14 for rotating about a vertical axis. The stator is arranged in a concentric arrangement of fixed stator blades 12 to condition and accelerate the incoming wind. It should be noted that the stator blades may be additionally capable of conditioning and accelerating gas, water or other fluid flows but for purposes of simplicity all embodiments within this disclosure will be based upon the collection of wind energy. The turning edge of each stator blade 12 is shaped to deflect the wind into the rotating direction of the rotor blades 14. The stator assemblage provides structural integrity about the system. Each stator blade 12 having a leading edge 16 and a trailing edge 18; a pressure surface 20 shaped concavely from a leading edge to a trailing edge, and an upper surface 22 shaped convexly from the leading edge 16 to the trailing edge 18.

The turbine assembly is preferably made from carbon fiber or the like light weight durable composite. The embodiment depicted has eight stationary stator blades and three rotor blades. The stationary stator blades 12 are about 30" tall and consist of a 0.02" thick shell with open ends. Armored end caps are bonded into each open end and a securing film is placed on the trailing edge 18. Each stator blade 12 receives a coating that is a UV protectant and made to a smooth shiny surface free of orange peel.

Stationary blade end plates (24, 26) have a diameter of about 26" (inches). The lower plate 24 has about a 0.075" thickness and the upper plate 26 about 0.185" thickness. Each plate receives a coating that is a UV protectant and made to a smooth shiny surface free of orange peel. Low friction sealed bearing housing 28 allows the rotor blade assembly to rotate freely. In a preferred embodiment, each plate includes a hub for attachment and cutouts as needed to access hardware. The cutouts do not affect the top-level wind turbine assembly structurally by static or dynamic forces and personnel are protected from flying components. The bearing housings described herein can be ball bearing or magnetic bearing. Unique to this invention is that the bearings are the only mechanical rotating part on the assembly.

The rotor blades 14 are about 28" tall and consist of a 0.02" thick shell with open ends. Each blade 14 has a leading edge 30 and a trailing edge 32. Armored end caps are bonded into each open end and a securing film is placed on the trailing edge 32. Each rotor blade 14 receives a coating that is a UV protectant and made to a smooth shiny surface free of orange peel. Each rotor blade 14 has a upper surface 31 and a lower surface 33.

Figure 4:
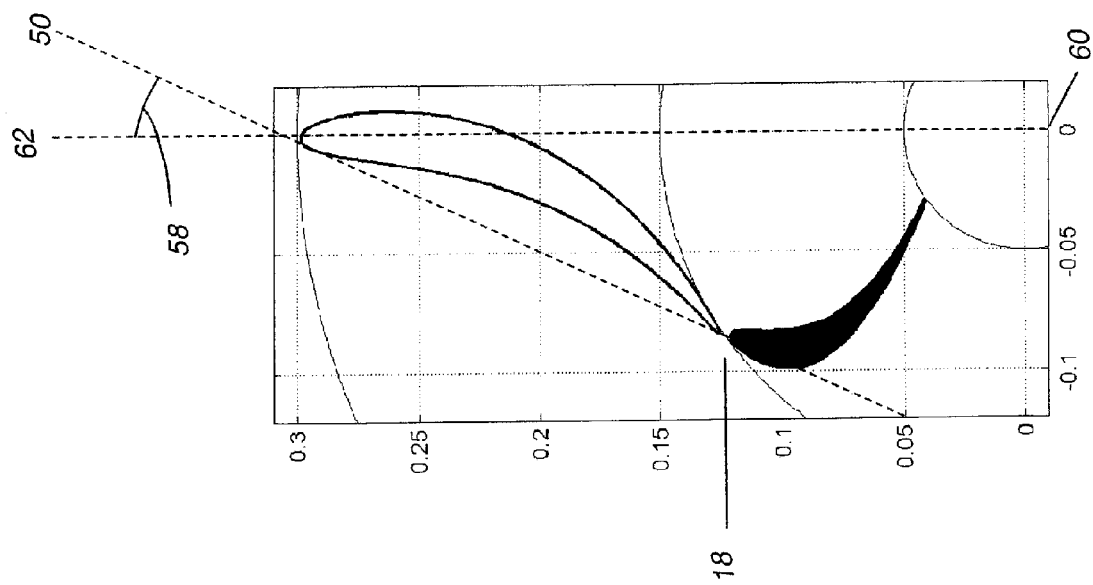
FIG. 4 is a graphical illustration of the relative position between a stator blade and a rotor blade.
Figure 5:
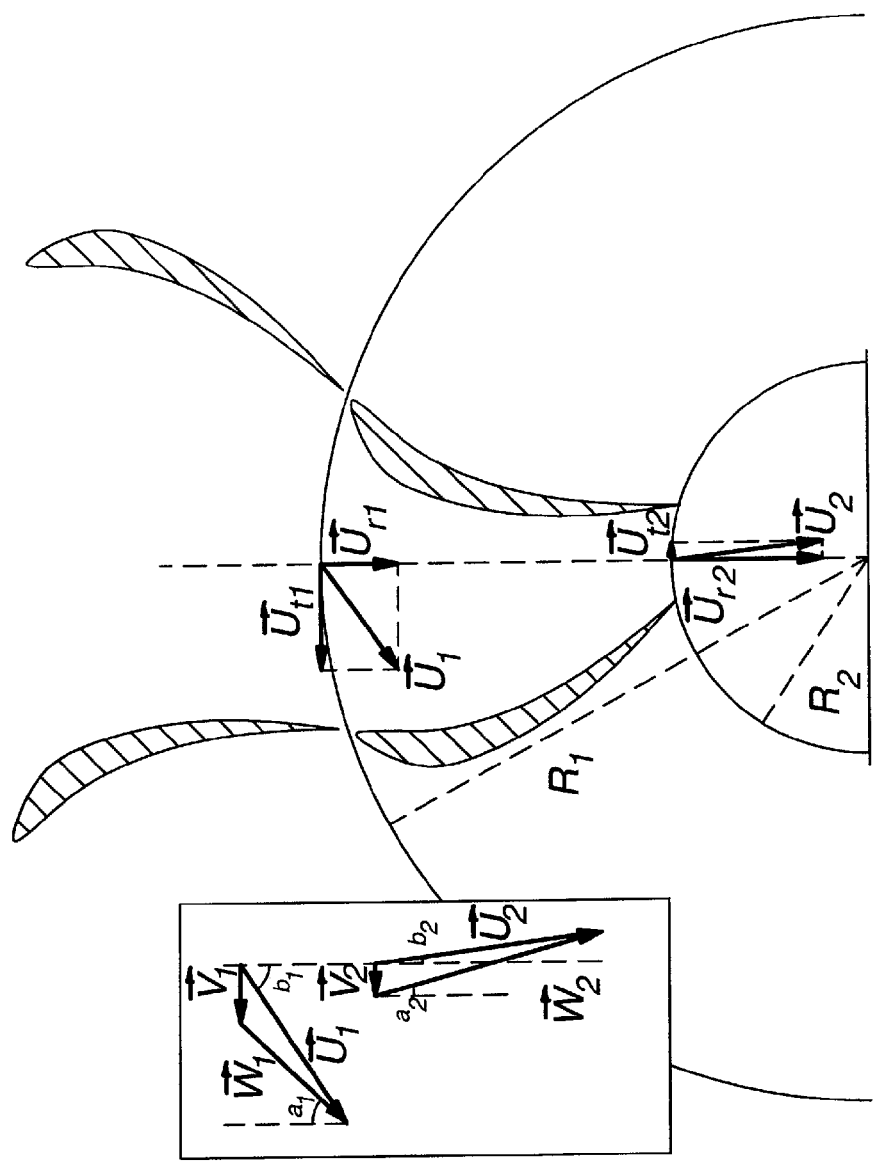
FIG. 5 is a graphical illustration of a pre-swirl of the incoming wind obtained from stator blade.
Figure 6:
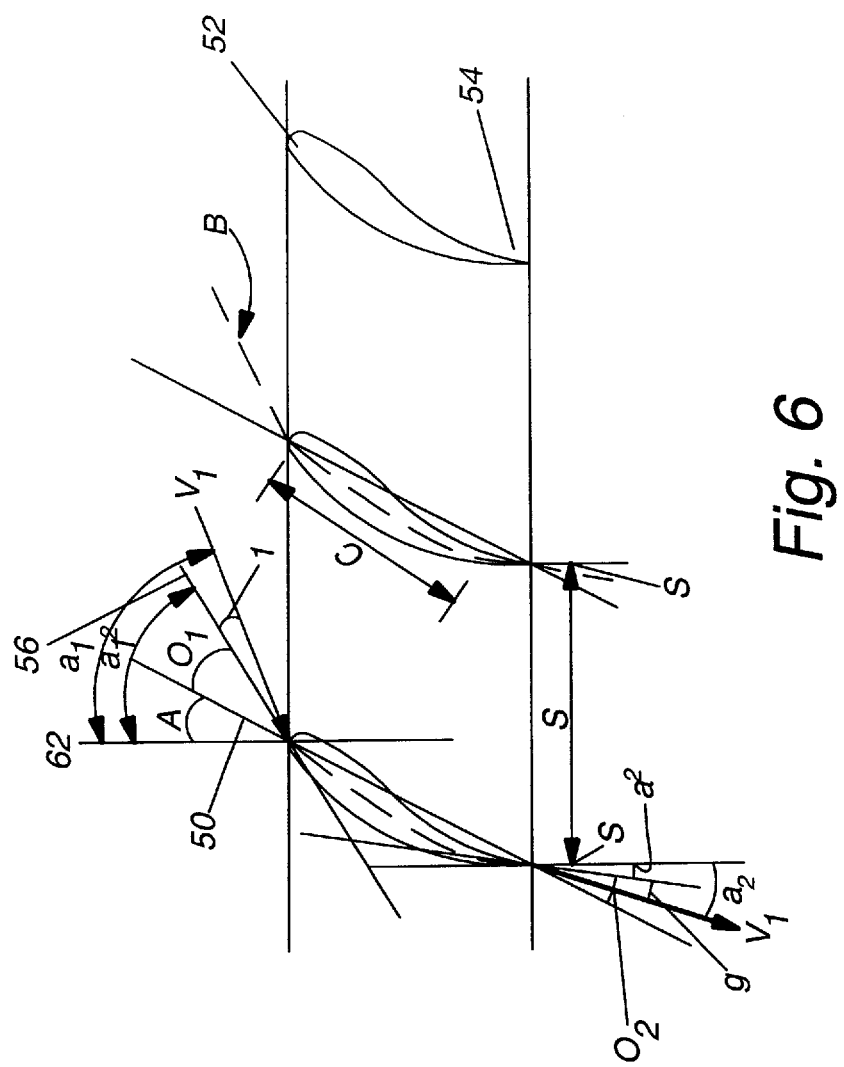
FIG. 6 depicts definition about a blade.

FIGS. 4-6 depicts the stator and rotary blade design including the chord line, camber line and stagger angle. Each stator blade 12 is oriented such that a sufficient stagger angle 58 exists between a first line 62 passing perpendicular from the leading edge 16 of the stator blade to the center of a vertical axis 60 and a second line 50 passing from said leading edge 16 of the stator blade 12 to the trailing edge 18 of said stator blade 12. The stagger angle 58 is positioned so that an angle of the relative velocity does not exceed the stall angle, between −50° and 50°, of the rotor blade. Each stator blade includes a turning angle between two tangential lines at the leading edge 16 and trailing edge 18 of the meanline between zero to ninety degrees.

The rotor assembly is a concentric arrangement of rotatable rotor blades 14 within the stator inner radius. The rotor blades 14 are designed to force the air into a large turning angle. The stator blade 12 and rotor blade 14 assembly can be scaled up in size or quantity, or both and include an unlimited number '$n_1$' of stator blades and may include an unlimited number '$n_2$' of rotor blades. The positioning of the blades, and the quantity thereof, can be positioned in relation to the wind. A wind can have a positive incidence value between stator openings, or a negative incidence value. A three rotor assembly may have one rotor at any given time in positive position with the wind, with eight stator blades for conditioning the wind. A six rotor blade assembly may have two rotors at any given time in positive position with the wind. A thirteen rotor blade assembly may have four rotors at any given time in positive position with the wind. Each rotor blade includes a turning angle between two tangential lines at the leading edge and trailing edge of the meanline between zero and one hundred fifty degrees.

Rotary blade end plates are defined as an upper plate 34 and a lower plate 36, each plate has about 20.03" diameter and each plate has about a 0.075" thickness. The plates receive a coating that includes a UV protectant and made to a smooth shiny surface free of orange peel. The low friction sealed bearing housing 28 is attached to the upper plate 34. The turbine assembly mounting surface shall mount to the generator adaptor so as to minimize mount flex to no more than 0.01" (+0.01"/−0.01"). A low friction sealed bearing housing 36 is attached to the lower plate 37 in combination with the stator lower plate 24. Generator to turbine assembly interface consists of a male shaft 38 from a generator which is coupled to the turbine by use of a female coupling. The male and female patterns act as a key for transmitting rotary torque from the turbine to a generator. One shaft shall be secured using a set crew to the female coupling. The other shaft will float freely.

The chord line 50 is the straight line drawn from the leading edge (LE) 52 to a trailing edge (TE) 54. To quantify camber line 56, a curved line drawn from the leading edge 52 to the trailing edge 54 staying always halfway between the upper surface and the lower surface would equal the mean camber line 56. The maximum difference between this and the chord line 50 is the amount of camber line 56 and can also be expressed as a distance or as a percentage of the chord length.

The method used to optimize the angles provide for the use of airfoil design within the stator/rotor combination for purposes of maximizing the expected mean power energy potential of the wind. Aerodynamic flow depends on the pitch angle and blade optimization comprise chord and twist determination along the blade axis. Each blade has an airfoil shape, chord length and camber line to define the angle. The (LE) 52 is a portion of the blade facing the incoming wind and a blade (TE) 54 is the tail end of the blade. The chord line 50 is orientated in a straight line connecting the (LE) and (TE) while the camber line 56 is orientated in a curved line connecting the (LE) 52 and (TE) 54 defining the camber of the blade, pitch 56 orientated is the (LE) 52 to (LE') 52' distance between two adjacent blades, turning angle is the deflection angle between the (LE) 52 and (TE) 54 camber lines, stagger angle 58 that is the angle between the blade chord line 50 and the turbine radius, incidence angle is the angle between incoming wind and camber line 56, and solidity is the ratio of chord divided by pitch.

| | |
|---|---|
| Blade leading edge (LE) | portion of the blade facing the incoming flow. |
| Blade trailing edge (TE) | tail end of the blade. |
| Chord line | straight line connecting the LE and TE. |
| Camber line | The meanline or the center line of the airfoil connecting the LE and TE and defining the camber of the blade. |
| Pitch | LE to LE distance between two adjacent blades. |
| Turning angle | deflection angle between the LE and TE camber lines. |
| Stagger angle | angle between the blade chord and the turbine radius. |
| Incidence angle | angle between the incoming wind and the camber line. |
| Solidity | ratio of chord divided by pitch. |

Velocity vectors as $U_{t1}$, $U_{r1}$, and $U_1$. $U_{r1}$ being the velocity radial component along $R_1$, $R_1$ being the radius to the outer diameter of the stator blades and $U_{t2}$ being the rotational speed vector along $R_2$, $R_2$ being the radius to the outer diameter of the rotor blades. The turned trailing edges of the stator blades generate the pre-swirl velocity of $U_{t1}$. It also reduces the passage area more than a radial trailing edge and hence accelerates the flow prior to striking the VAWT. Indices 1 and 2 on the vectors indicate blade inlet and outlet location, respectively. V is the rotating velocity of the blade and varies with the radius, W is the relative flow velocity observed on the rotating frame with the turbine, and U is the absolute velocity observed on the ground. Increased mass flow rate, rotating velocity, and flow turning will increase the turbine work output. This working principle is the same as that of aircraft engine turbines.

The stator blade is oriented such that the sufficient stagger angle 58 exists between a first line 62 and a second line 50, the first line 62 passing perpendicular from the LE of the stator blade to the center of vertical axis 60, the second line 50 passing from the LE 16 of the stator blade to the TE 18 of the stator blade. In order to be efficient, the stagger angle of the stator and rotor are computed such that the angle of the relative velocity (in the rotor frame of reference) does not exceed the stall angle of the rotor. This stall angle is determined to be between −50° and 50° for the current embodiments of the invention. Take FIG. 4 as example, the stagger angle on the left of the vertical radial line is defined as negative, on the right is defined as positive.

The stator blades are configured to allow a prevailing wind to pass between any two adjacent stator blades 12. The stator blades constructed and arranged to accelerate fluid flow prior to contacting the rotatable rotor blades 14. One aspect of the instant invention includes a plurality of adjacent stator blades, each stator blade arranged to permit passage of a fluid flow between an adjacent stator blades and further each stator blade arranged for accelerating the fluid flow, at least one rotor blade 14 arranged to be rotated by the accelerated fluid flow.

The work extracted from the wind by the rotor strongly depends on the angular velocity (RPM) but also the incidence angle at which the wind coming out of the stator strikes the rotor leading edge. The preferred incidence angle is about two degrees (2°). In turns, this angle also depends on the angular velocity. In order to do these calculations, two major inputs are needed: incoming wind speed and RPM. For all turbines, HAWT and VAWT, the single formula: $P=\frac{1}{2}\rho A K V^3$ holds. This is Power equal to the product of density ($\rho$), frontal area (A) and wind speed (V). The efficiency coefficient (K) is to be determined and can change with various wind speed.

Adjacent stator blades 12 accept prevailing wind there between, the geometry and arrangement of each stator blade causing an acceleration of the prevailing wind; the adjacent stator blades direct the accelerated fluid flow into rotor blades for rotation. The rotor blades 14 may be adjusted to change the pitch of the rotor blades to accommodate typical winds at the installed location.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A turbine comprising: a stator section formed from a plurality of geometrically shaped vertical stator blades having a leading edge and a trailing edge with an upper surface shaped convexly from said stator blade leading edge to said stator blade trailing edge and a pressure surface shaped concavely from said leading edge to said trailing edge, each said stator blade having an upper end secured to a fixed stator top plate and a lower end secured to a fixed stator bottom plate, each stator blade oriented to provide a stagger angle wherein said upper surface of said stator blade constructed and arranged to accelerate a fluid flow; a rotor section formed from a plurality of geometrically shaped vertically blades having a leading edge and a trailing edge with an upper surface shaped convexly from said rotor blade leading edge to said rotor blade trailing edge and a lower surface shaped concavely from said rotor blade leading edge to said rotor blade trailing edge, each rotor blade having an upper end secured to a rotatable top plate and a lower end secured to a rotatable lower plate constructed and arranged to rotate about a longitudinal axis within said stator section; each said stator blade is oriented such that a sufficient stagger angle exists between a first line passing perpendicular from the leading edge of said stator blade to the center of the vertical axis and a second line passing from said leading edge of the stator blade to the trailing edge of said stator blade wherein trailing edges of said stator blades are constructed and arranged to generate a pre-swirl velocity whereby the fluid flow is accelerated prior to striking a rotor; wherein fluid directed past two adjacent stator blades is accelerated for use in enhanced rotation of said rotor section.

2. The turbine according to claim 1 wherein each said stator blade includes a turning angle between two tangential lines at the leading edge and trailing edge of the meanline between zero to ninety degrees.

3. The turbine of claim 1 wherein each said rotor blade includes a turning angle between two tangential lines at the leading edge and trailing edge of the meanline between zero and one hundred fifty degrees.

4. The turbine according to claim 1 wherein said stagger angle is positioned so that an angle of the relative velocity does not exceed the stall angle of said rotor blade.

5. The turbine according to claim 4 wherein said stall angle of said rotor blade is between −50° and 50°.

6. The turbine according to claim 1 wherein each said rotor blade has an incidence angle of about two degrees (2°).

7. The turbine according to claim 1 wherein power produced is equal to $P = \frac{1}{2}\rho A K V^3$ wherein the ($\rho$) is the product of density, (A) is the frontal area, (K) is the efficiency coefficient and (V) is the fluid speed.

8. The turbine according to claim 7 wherein the efficiency coefficient (K) is changed with various fluid speed.

9. The turbine according to claim 1 wherein pitch of said rotor blades is adjusted to accommodate typical fluid flow at an installed location.

10. The turbine according to claim 1 wherein fluid is air.

11. The turbine according to claim 1 wherein said longitudinal axis is substantially vertically.

12. A vertical axis turbine comprising: a stator section formed from a plurality of geometrically shaped vertical stator blades having a leading edge and a trailing edge with an upper surface shaped convexly from said stator blade leading edge to said stator blade trailing edge and a pressure surface shaped concavely from said leading edge to said trailing edge, each said stator blade having an upper end secured to a fixed stator top plate and a lower end secured to a fixed stator bottom plate, each stator blade oriented to provide a stagger angle wherein said upper surface of said stator blade constructed and arranged to accelerate a fluid flow; a rotor section formed from a plurality of geometrically shaped vertically blades having a leading edge and a trailing edge with an upper surface shaped convexly from said rotor blade leading edge to said rotor blade trailing edge and a lower surface shaped concavely from said rotor blade leading edge to said rotor blade trailing edge, each rotor blade having an upper end secured to a rotatable top plate and a lower end secured to a rotatable lower plate constructed and arranged to rotate about a longitudinal axis within said stator section; each said stator blade is oriented such that a sufficient stagger angle exists between a first line passing perpendicular from the leading edge of said stator blade to the center of the vertical axis and a second line passing from said leading edge of the stator blade to the trailing edge of said stator blade wherein trailing edges of said stator blades are constructed and arranged to generate a pre-swirl velocity whereby the fluid flow is accelerated prior to striking a rotor; wherein fluid directed past two adjacent stator blades is accelerated for use in enhanced rotation of said rotor section; wherein air directed past two adjacent stator blades is accelerated for use in enhanced rotation of said rotor section.

13. The vertical axis turbine according to claim 12 wherein each said stator blade includes a turning angle between two tangential lines at the leading edge and trailing edge of the meanline between zero to ninety degrees.

14. The vertical axis turbine of claim 12 wherein each said rotor blade includes a turning angle between two tangential lines at the leading edge and trailing edge of the meanline between zero and one hundred fifty degrees.

15. The vertical axis turbine according to claim 12 wherein said stagger angle is positioned so that an angle of the relative velocity does not exceed the stall angle of said rotor blade.

16. The vertical axis turbine according to claim 15 wherein said stall angle of said rotor blade is between −50° and 50°.

17. The vertical axis turbine according to claim 12 wherein each said rotor blade has an incidence angle of about two degrees (2°).

18. The vertical axis turbine according to claim 12 wherein power produced is equal to $P = \frac{1}{2}\rho A K V^3$ wherein the ($\rho$) is the product of density, (A) is the frontal area, (K) is the efficiency coefficient and (V) is the air speed.

19. The vertical axis turbine according to claim 18 wherein the efficiency coefficient (K) is changed with various air speed.

20. The vertical axis turbine according to claim 12 wherein the pitch of said rotor blades is adjusted to accommodate typical air flow at an installed location.

\* \* \* \* \*